June 20, 1967  B. BILBAO  3,326,552
APPARATUS TO SERVE IN GAME, TOY, EDUCATIONAL
AND DISPLAY DEVICES
Filed Sept. 18, 1963  4 Sheets-Sheet 1
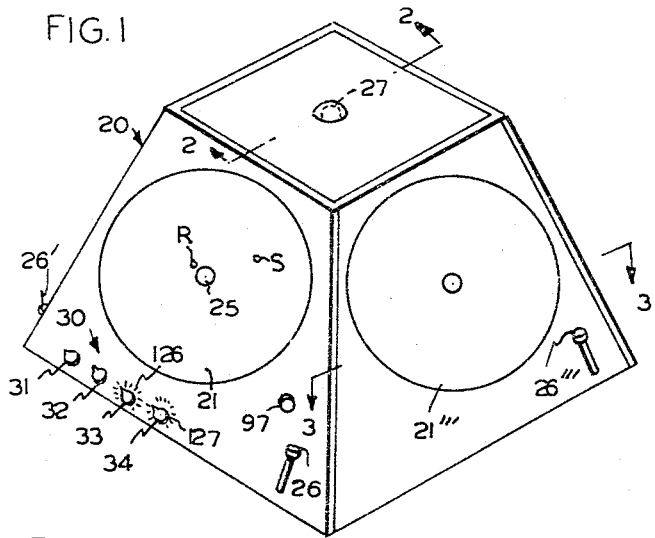
FIG. 1
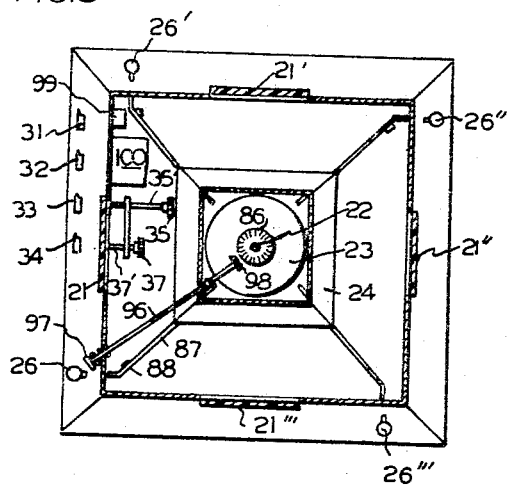
FIG. 3
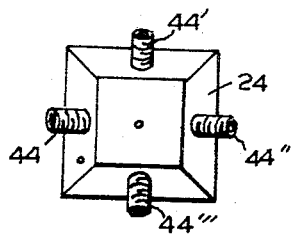
FIG. 5
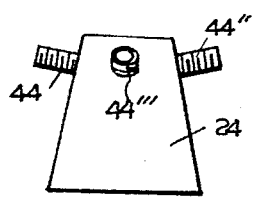
FIG. 4
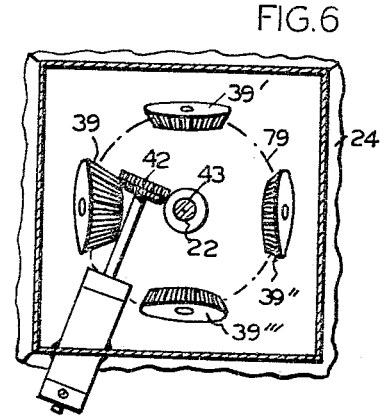
FIG. 6
FIG. 7
INVENTOR.
BENJAMIN BILBAO,
BY
ATTORNEY.

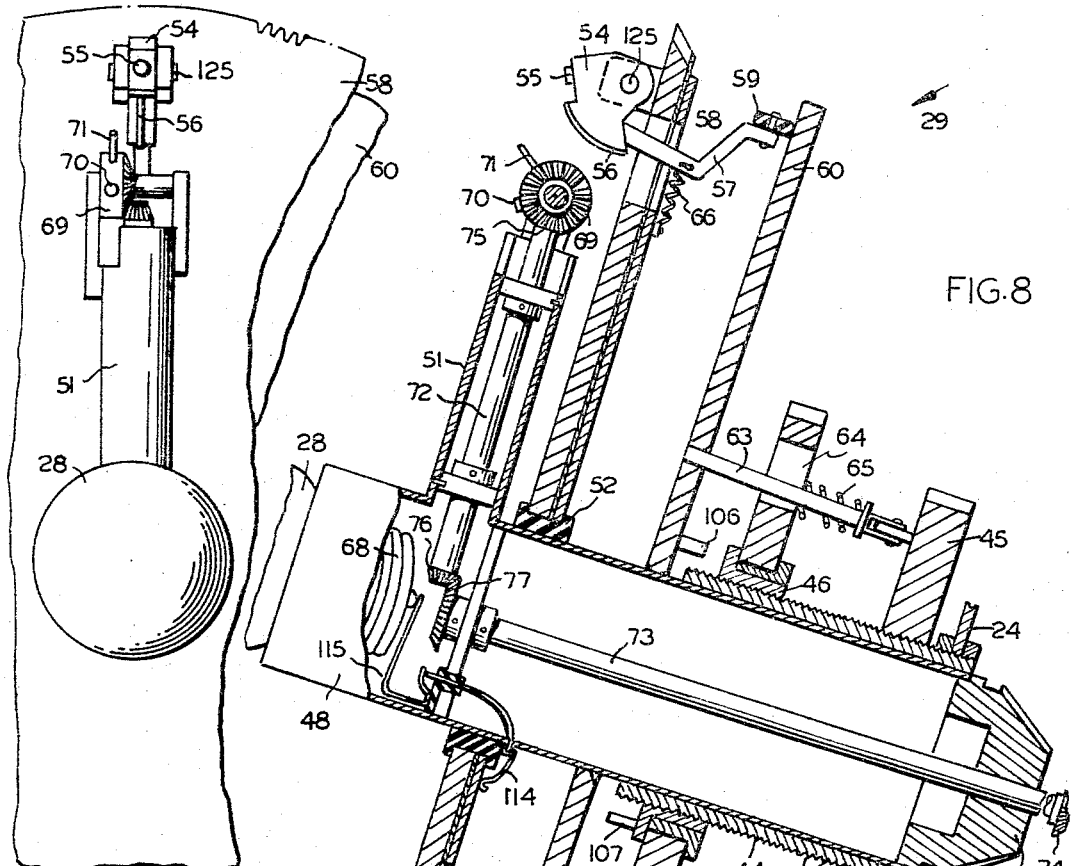
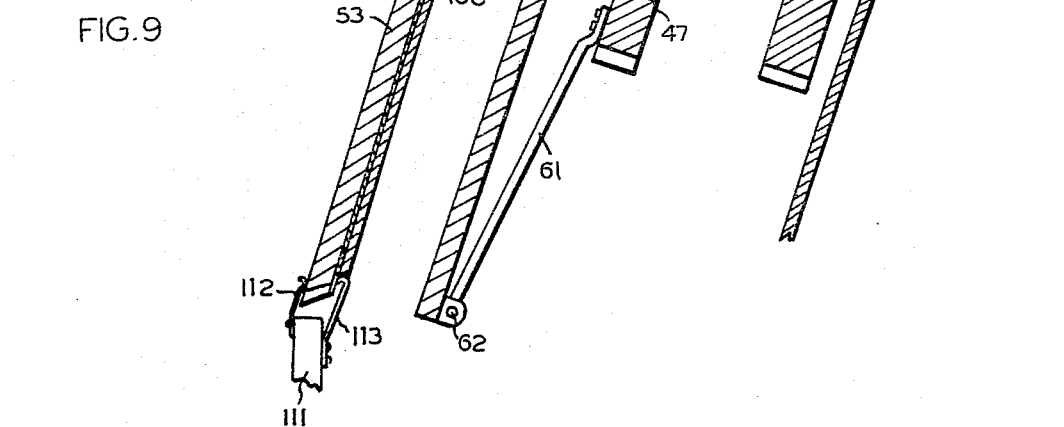
FIG. 9
FIG. 8

June 20, 1967  B. BILBAO  3,326,552
APPARATUS TO SERVE IN GAME, TOY, EDUCATIONAL
AND DISPLAY DEVICES
Filed Sept. 18, 1963  4 Sheets-Sheet 4
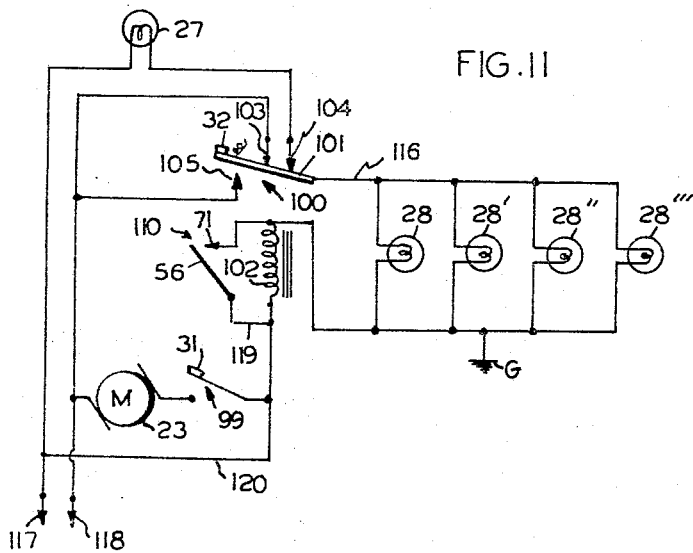
FIG. 11
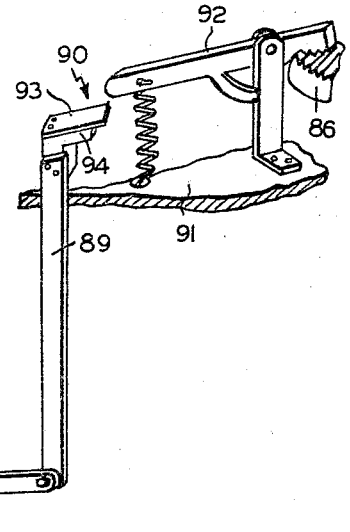
FIG. 10
FIG. 12
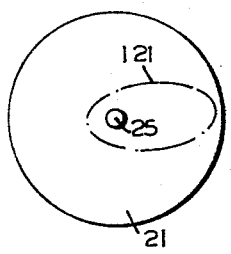
FIG. 13
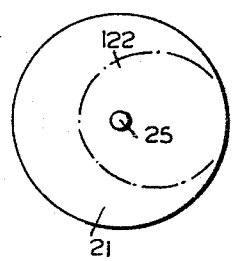
FIG. 14
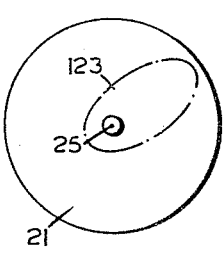
FIG. 15
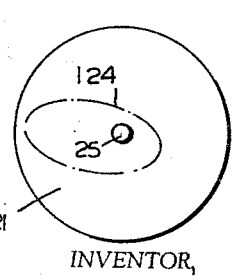
FIG. 16
INVENTOR,
BENJAMIN BILBAO,
BY
ATTORNEY.

United States Patent Office 3,326,552
Patented June 20, 1967

3,326,552
APPARATUS TO SERVE IN GAME, TOY, EDUCATIONAL AND DISPLAY DEVICES
Benjamin Bilbao, 36—36 24th St.,
Astoria, N.Y. 11102
Filed Sept. 18, 1963, Ser. No. 309,810
32 Claims. (Cl. 273—1)

The present invention relates to apparatus to serve in game, toy, educational and display devices.

As an example of its teachings, a game embodiment is set forth herein which simulates a satellite in orbit around the earth and a rocket on the earth to be shot to intercept the satellite. In particular, there is a unit of mechanism behind a translucent screen, providing one light spot representing the satellite which is made to move in orbit on the screen while another light spot representing the rocket on the rotating earth, is made to move on the screen to cross said orbit, by manual operation of a trigger means. If the rocket is "shot" in proper timed relation to satellite movement, the light spots meet and a "hit" is scored.

An object of this invention is to provide a novel and improved apparatus of the character mentioned, to cause the satellite light spot to move in an elliptical orbit and further, to provide separate manual controls to change the size, shape and tilt of such orbit, and its position.

A further object thereof is to provide a novel and improved apparatus of the kind described, to cause the rocket light spot to move to cross said orbit, and further, that when the rocket light spot is shot and fails to intercept the satellite light spot, said rocket light spot will be seen to cross the orbit and continue beyond, but if there occurs interception, the light spots will disappear. If desired, an indicator device is included which will become actuated when there is a hit.

Another object of this invention is to provide that the rocket light spot be reinstated at the earth's position to serve as the "next" rocket to be fired. Such restoration may be automatically or manually effected.

A further object thereof is to provide that both the satellite and rocket light spots shall be derived from a single light source.

Another object of this invention is to provide that the rocket light spot while on earth, shall rotate about the earth's axis to simulate true celestial conditions existing between rocket and satellite, and when shot, the path taken by the rocket light spot shall travel in a curved path towards the orbit to simulate true physical conditions of a projectile in flight.

A further object is provide an apparatus presenting a plurality of screens and duplicate mechanism units therefor, each provided with its own trigger so that a number of persons around a table may play the game, but only one unit shall have the controls to change the orbit. The several units shall work in unison and be synchronized so that the performances on all screens are identical. Hence, each player will observe in his own screen how the others have fared; the players taking a shot, in succession.

Still another object of this invention is to provide a novel and improved apparatus of the kind set forth, having the mentioned attributes and which is efficient in carrying out the purposes for which it is designed.

Other objects and advantages will become apparent as this disclosure proceeds.

A game apparatus which is one practice of this invention, may assume the following construction. Each of the upright walls of a casing of rectangular section, has a translucent window which serves as a screen. These screens are preferably in upward convergent relation to accommodate convenient viewing by the players seated around a table on which the apparatus rests. Centrally within said casing, is a vertical shaft driven by an electric motor. Between this shaft and each of the screens, is a mechanism unit, all of which are substantially identical. One of these units is associated with control means. Extending outwardly of the casing at each screen frame, is a trigger element.

Each of said mechanism units comprises a fixed, short tubular member supported on an inner frame and extending coaxially with a translucent button at the center of a screen. This tubular member is exteriorally threaded and carries threadedly engaged thereon, two gear means. Rotatably journalled within said tubular member is a relatively long tubular shaft which extends near to button region of the screen, where said shaft end carries an electric bulb. The other, the inner end of said tubular shaft, extends out of said threaded tubular member towards the motor shaft, where it terminates in a gear fixed thereto; such gear meshing with a gear fixed on the motor shaft. A bit inwardly spaced from the bulb-carrying end thereof, said hollow shaft carries a comparatively large gear fixed thereto. Between this last-mentioned gear and the threaded tubular member, said hollow shaft carries a disc which serves as a cam for a first mirror which is swingably mounted on said large gear. Said cam is tiltable and turnable on said hollow shaft and is also slidable therealong by manipulation of the gears on the threaded tubular member, respectively. Intermediate the bulb and the mentioned very large gear on the said tubular shaft, such shaft has a laterally extending tubular branch at whose free end is a rotatably mounted second mirror. This second mirror receives light from the bulb and throws a light spot on the screen right next to the button, to serve as the rocket light spot. The aforementioned first mirror receives light from said bulb and throws a light spot on the screen away from the button, to serve as the satellite light spot. Means brought into play upon operation of the trigger, causes the second mirror to turn one revolution so that the rocket light spot will travel across the satellite's orbit, and said mirror will return to its initial position on earth. Gear means are provided so that all the mechanism units work in synchronism. The control means at one of said units afford selective movement of the gear means on the threaded tubular member, to effect tilting of the cam, sliding of the cam and turning of said cam on the hollow shaft.

The motor shaft carries various gears. Uppermost thereon there is fixed a very large gear which meshes with the very large gears on all the hollow shafts of the respective units. Below this common drive gear, the motor shaft has two gears loose thereon, for engagement with the respective corresponding gear means on the threaded tubular members of the units. Also there is gear means to move all the rocket light spot mirrors to accomplish synchronism.

When there is a "hit," metal elements on the mirror-carriers come into contact to operate a circuit breaker to open the lamp circuit and also to close the circuit of a signal lamp.

A more detailed description will now be set forth of the apparatus mentioned and of the use of its components in various arrangements and the modes of operation thereof, for all of which, reference is now made to the accompanying drawings forming part of this specification, in which drawings, similar characters of reference indicate similar parts in all the views.

FIG. 1 is a perspective view showing a game apparatus embodying teachings of this invention.

FIG. 2 is an enlarged section taken at lines 2—2 in FIG. 1.

FIG. 3 is a section taken at lines 3—3 in FIG. 2, omitting various parts in order to attain clarity of illustration.

Figure 8:
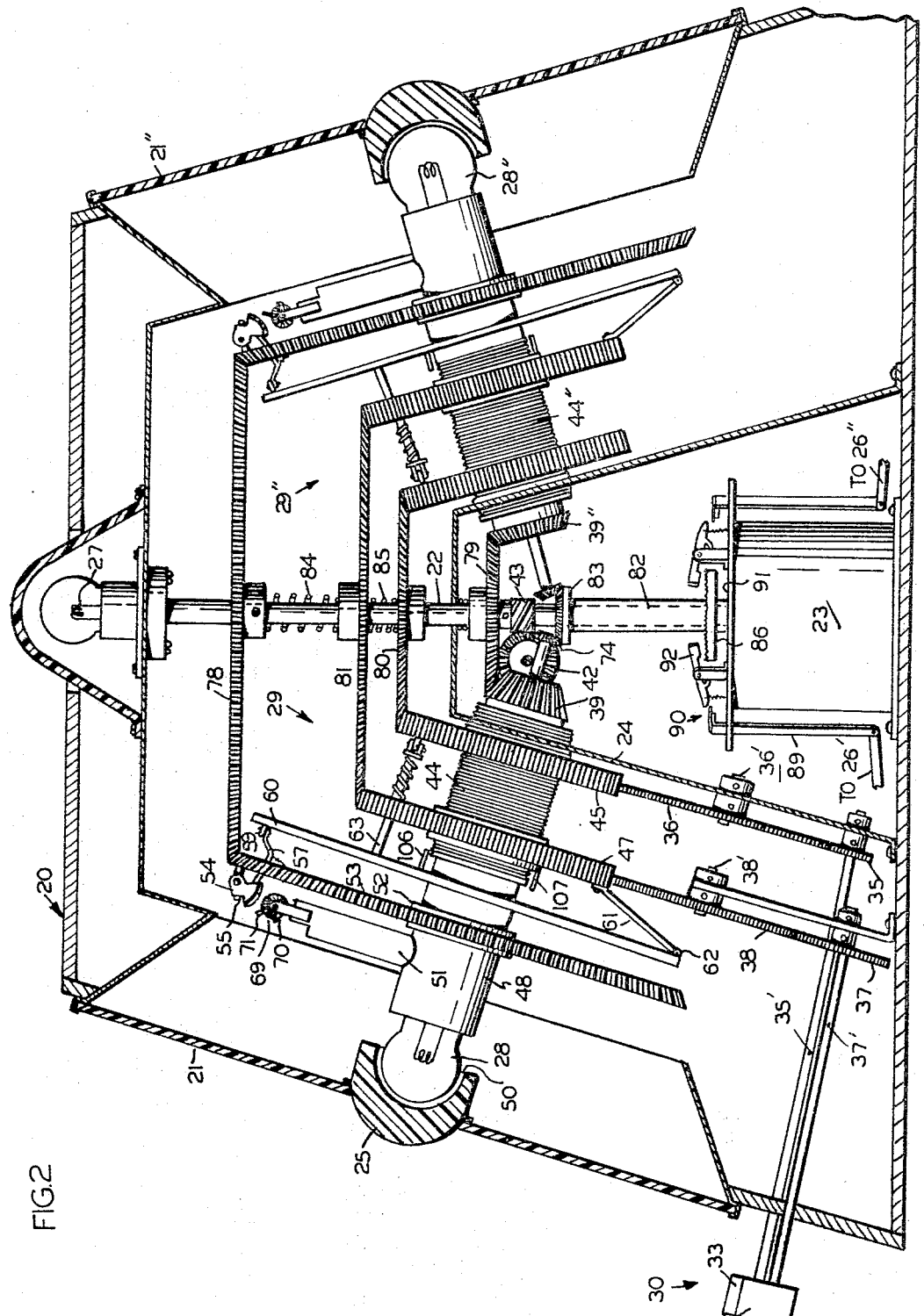

In particular, this view shows the controls and the trigger levers as well as manually-operated means to restore the rocket light spots to their position on "earth."

FIG. 4 is an elevational view of the inner casing which houses the motor, and the exteriorally threaded tubular members which extend respectively from the upright walls of such inner casing, which are part of and serve to support the respective mechanism units which produce the light spots on the screens, and cause such light spots to move in predetermined paths.

FIG. 5 is a top plan view of FIG. 4.

The FIGS. 1, 3, 4 and 5 are drawn to the same scale.

FIG. 6 is a top plan view, shown partly in section, of the gears secured on the inner ends of the hollow shafts which are journalled respectively in the exteriorally threaded tubular members of FIG. 4. Also shown is a speed reduction means interposed between the motor-driven shaft and one of said gears.

FIG. 7 is a modified construction of the mechanism shown in FIG. 6.

The FIGS. 6 and 7 are drawn to the scale of FIG. 2.

FIG. 8 is an enlarged centrally lengthwise sectional view of one of the mechanism units, and in particular, is the one which is associated with the control means for changing the satellite orbit.

FIG. 9 is an end view thereof as seen from the left in FIG. 8.

FIG. 10 is a perspective view of the trigger device and of a trip associated with such trigger. This view is drawn to an enlarged scale.

FIG. 11 shows the electrical wiring diagram of the circuit employed to control the lamps and the motor in the apparatus of FIG. 1.

FIG. 12 shows a modification in which the light spot to represent the rocket, is offered by a battery-powered flashlight.

FIG. 13 shows a screen, on which by a dash and dot line, a satellite orbit is indicated.

FIG. 14 is a view like FIG. 13, showing said orbit enlarged.

FIG. 15 is a view like FIG. 13, but shows the orbit of FIG. 13, tilted.

FIG. 16 is a view like FIG. 13, but shows the orbit of FIG. 13, in reverse position on the screen.

In the preferred embodiment of this invention shown in the drawings, each of the four substantially upright walls of the casing 20, has a comparatively large circular opening covered by a translucent pane. These panes, serving as the viewing screens, are designated by the numerals 21, 21', 21" and 21''', respectively. Centrally within said casing, is a vertical shaft 22 driven by the motor 23, which is housed in an inner casing 24 having walls which are parallel to the walls of the casing 20, respectively. Through the center of each screen, is a button like element 25 which shall be deemed to represent the earth. Within the casing 20, behind each of the said screens, is a mechanism to produce a light spot which is normally close to and moves around the button, to represent a rocket on earth, and to produce a second light spot travelling in orbit around the earth, with means that the performance on all the screens shall be identical. One of said mechanism units is provided with control means to change said orbit. Said second light spot on the screen is deemed a satellite. On the screen 21, the rocket is represented by the light spot R and the satellite is represented by the light spot S. At each screen, there is a trigger like element 26, whose operation causes the rocket light spot to move across the orbit of the satellite light spot. If there is a "hit," both the light spots disappear, because then, the circuit of the light bulb 28 is opened, and the hit signal light bulb 27, will light up. All of said mechanism units are identical, except the one which has the controls, where the difference is slight, besides the addition of the control means. A detailed description of said one that has the controls, will suffice for the others. Any differences occurring will be pointed out, but where nothing is said, all the four mechanism units associated with said screens respectively, shall be deemed identical.

The mechanism unit associated with the screen 21, is designated generally by the numeral 29, and is the only one having the controls which are designated generally by the numeral 30. There are four control knobs which are respectively designated by the numerals 31, 32, 33 and 34. Also in association only with this mechanism unit 29, are the gear train comprising the gears 35, 36 to turn the gear 45, and the gear train comprising the gears 37, 38 to turn the gear 47, and the journalled shafts 35', 36', 37' and 38' for said gears 35, 36, 37 and 38, respectively. The knob 33 is fixed on the shaft 35'. The knob 34 is fixed on the shaft 37'. The gear 39 of the unit 29, except for being thicker, is otherwise identical with the corresponding gear 39''' of the mechanism unit indicated generally by the numeral 29", which latter is associated with the screen 21". The reduction drive offered by the meshed wheel 42 and worm 43, is associated only with the mechanism unit 29. The mechanism units not shown, meaning those associated respectively with the screens 21' and 21''', are the same as the mechanism unit 29".

A description therefore of the unit 29, as mentioned will suffice for the others, after stating that each unit includes an exteriorally threaded tubular member which is fixed to and communicative with the inner casing 24. Each of these exterior threaded tubular members, denoted as 44, 44', 44" and 44''', respectively, extend from a wall of said inner casing 24, towards one of the screens respectively, and each of said members are coaxial respectively with the central button on a screen.

The fixed, exteriorly threaded tubular member 44 has threadedly engaged thereon the gear 45, and nearer to the screen 21, the ring channel 46 which latter holds the gear 47 for rotation only thereon. Said tubular member 44 serves as a bearing for the elongated tubular shaft 48 which is journalled for rotation therein and extends outwardly therefrom towards the screen 21, where it terminates in a socket 68 holding the light bulb 28 which extends into a cavity 50 in the button 25. Near this end, said hollow shaft 48 has a communicative laterally extending branch 51. Behind this branch, said hollow shaft carries a fixed journal of insulative material indicated as 52, which has the relatively large metal gear 53 freely rotatively mounted thereon. Near the periphery, on its front face, said gear 53 has swingably mounted thereon, the satellite mirror carrier 54 which presents the mirror 55 to throw the light spot S on the screen 21, and also the arcuate contact strip 56. This mirror-carrier has a rearwardly extending arm 57 which passes through a radial slot 58 in the gear 53 and terminates in a dielectric roller 59 which is the follower for the cam plate 60. This plate, whose front flat surface is contacted by said follower, is carried on the shaft 48 and is free to turn, slide and tilt thereon. A bar 61, extending from the gear 47, is pivoted at 62 to said cam plate 60. A follower 63 extends rearward from said cam plate 60, through a radial slit 64 in the gear 47 and bears against the front face of the gear 45. A spring 65, serves to maintain such contact. A spring 66 serves to keep the cam follower 59 against the cam plate 60.

The tubular branch 51, at its distal end, carries a rotatably mounted face gear 69 on whose periphery is a mirror 70 to effect a spot of light R near the button 25 on the screen 21. The axis of rotation of said mirror-carrying gear 69 and that of the mirror-carrier 54, are perpendicular to the axis of the tubular shaft 48. Said gear 69 also carries a radially projecting finger 71 to brush the strip 56 when the light spots R and S coincide. A shaft 72 is journalled for rotation within the branch 51. The gear 39 is fixed to the inner end of the tubular shaft 48 and serves as a bearing for the shaft 73 which extends through said gear 39 at its inner end, near the motor shaft 22. Such shaft 73 carries the bevel gear 74.

A gear formation 75 at one end of the shaft 72, meshes with the face gear 69 and a gear formation 76 at its other end, meshes with the gear 77 which is fixed on the shaft 73. Thus, upon the stopping of the shaft 73, the mirror-carrying face gear 69, will turn.

The motor shaft 22 carries fixed thereon the gear 78 which meshes with the gear 53 and with gears corresponding to the gear 53 of the other mechanism units. The motor shaft 22 also carries loosely thereon the gear 79 which meshes with the gear 39 and the corresponding gears 39′, 39″, 39‴ of the other mechanism units respectively. The motor shaft 22 also carries loosely thereon the gear 80 which meshes with the gear 45 and the corresponding gears of the other mechanism units. Said motor shaft 22 also carries loose thereon the gear 81 which meshes with the gear 47 and the corresponding gears of the other mechanism units. The motor shaft 22 also carries loosely thereon a sleeve 82 having the gear 83 fixed at the top end thereof, which latter meshes with the gear 74 and the corresponding gears of the other mechanism units. Compression coils springs 84 and 85, interposed as shown, maintain the gears 80 and 81 in their respective engaging positions.

The very loose sleeve 82 has a face gear 86 fixed to its lower end. Each of the triggers 26, 26′, 26″, 26‴ includes a lever as shown at 87, pivoted intermediate its ends as at 88, and at its inner end is pivotedly connected to the lower end of an upright link 89, which terminates at top end in a trip designated generally by the numeral 90; said link being slidably retained through a suitable slot in the plate 91 fixed atop the electric motor 23. When the trigger is pressed downward, this trip will swing a spring biased lever 92 to engage as a clutch with the gear 86, and thereby hold the sleeve 82 stationary. This engagement is only temporary and is intended to last only sufficiently to allow the mirror carrier 69, one revolution. Said trip includes a leaf spring 93, fixed at one end onto a supporting element 94 carried on the link 89. Upon actuating the trigger 26, said leaf spring 93, in the upward movement of said link, will momentarily engage the lever 92 to engage the gear 86, but upon continued upward movement, will wipe the lever end and pass it, whereupon such lever will disengage from said gear 86. Upon release of the trigger, which is biased by a spring 95 to return to normal rest position, the leaf spring 93 will lift and pass the lever 92 and come under it, ready for the next operation of the trigger 26. The leaf spring 93 extends beyond its supporting element 94, and it is the length of the extending part which engages with the lever 92, that will be the factor determining the mentioned timing of the engagement period by the lever 92 and the gear 86; such engagement is also in the nature of a braking action. There is also provided a manual adjustment means if desired, to bring the mirror-carrier 69 to its normal rest position. This is offered by the spring-biased slidable rod 96, having the knob 97 fixed at its end which is exterior the apparatus, and has the gear 98 at its inner end; said gear 98 being normally spaced from the gear 86 and adapted to mesh therewith when the knob 97 is pushed inward. Then, upon turning such knob, when the apparatus is at rest, the sleeve 82 is made to turn, and thus, the mirror carrier 69 is turned back to its required normal rest position, and because of the turning of the gear 83, the mirror carriers of all the mechanism units will be identically moved.

The knob 31 is the operating member of the switch 99 which controls the motor 23. The knob 32, when pressed inward, sets the switch mechanism denoted generally by the numeral 100, by shifting the conductive armature 101 of a solenoid coil 102, away from the fixed contact elements 103 and 104, and into contact with the fixed contact element 105. The knob 33, when turned, will turn the gear 45 which will ride along the tubular screw 44, and because the gear 80 will be turned thereby, all gears of the other mechanism units which correspond to the gear 45, will be turned identically with the movement given the said gear 45, and all the cam plates as 60, will have their tilt changed. The knob 34 when turned, will turn the gear 47 on the annular channel 52, and because the gear 81 will be turned thereby, all gears of the other mechanism units which correspond to the gear 47, will be turned identically with the movement given the gear 47, and all the cam plates as 60, will be turned identically. When the cam plate is given sufficient turn, the pin 106 extending therefrom laterally, will intercept the pin 107 which extends laterally from the annular channel 46, and thereupon said annular channel 46 will turn and ride on the tubular screw 44, thereby shifting the cam plate 60 along the tubular shaft 48. This will of course occur in all the mechanism units, simultaneously and identically.

The gear 53 is of metal, set to revolve on the tubular shaft 48, within an annular channel 52 which is of insulative material. This gear 53 carries a metal disc 108 insulated therefrom by an insulative sheet 109. The bent arm 57 which extends from the metal mirror carrier 54 having the metal contact strip 56, is of insulative material. The mirror-carrier 69, its pin 71, the shafts 72, 73 and all the gears they carry, the tubular shaft 48, the gears 39, 74 and 83, the sleeve 82 and its gears, the motor shaft 22 and the casing of the motor 23, are all of metal and constitute frame or ground G in the wiring diagram shown in FIG. 11. The contact elements 56 and 71, constitute a switch 110.

An insulative fixed post 111 carries a conductive brush element 112 which contacts the gear 53, and also said post carries another conductive brush element 113 which contacts the disc 108. This disc is also contacted by a conductive brush element 114 which is carried by and insulated from the tubular shaft 48. This element 114 is connected to a blade spring element 115 which is insulatively secured in the interior of said tubular shaft 48, and is arranged to make contact with the central terminal of the light bulb 28; the other terminal of said bulb, being the grounded screw shell 68. The gear 78 is of insulative material, or may be of metal and insulated from the motor shaft 22 and from the frame part of the apparatus.

Only one switch 110 is required for the apparatus and hence on the mechanism units other than 29, there is no brush element 112 or contact elements 56 and 71. The brush 113 and the corresponding brushes of the other mechanism units connecting with the respective light bulbs 28, 28′, 28″, 28‴, are all connected by a conductor 116. This conductor connects all the terminals of said light bulbs which are insulated from ground, to the armature 101 of the switch mechanism 100. The motor 23 in series with its control switch, as a unit circuit branch, is connected across the terminals 117 and 118 of a plug for connection to an electric power source. One terminal of the light bulb 27 is connected to terminal 117, while the contact element 104 is connected to the other terminal of said light bulb 27. The contacts 103 and 105 are connected to the power terminal 118. The brush 112, and hence the contact strip 56, is connected by a connector 119 to one terminal of the solenoid coil 102; the other terminal of said coil, being connected to ground G. It has already been mentioned that the contact element 71 is connected to ground G.

When no current is being applied to the terminals 117, 118, the switch 100 will be in condition as shown in FIG. 11, where the armature 101 contacts the contact elements 103 and 104. The switches 99 and 110 are in open condition. Now upon applying current to the terminals 117, 118, the bulb 27 will become lit and so it will serve as a pilot light to indicate that the current is on. Upon closing the switch 99 by manipulation of its control knob 31, the motor 23 will operate. Upon pushing the control knob 32 inwards to bring the armature 101 away from the contacts 103, 104 to open the circuit of the lamp 27 and to bring said armature into contact with the contact element 105, current will flow through the magnet coil 102 and thus hold the armature 101 to its moved position in contact with the contact element 105, and current will also flow through the lamps 28, 28', 28'', 28'''.

Tracing the current flow, it will start from the power terminal 117, then go through the conductor 120, then through the coil 102 to ground G, thence through the light bulbs 28, 28', 28'', 28''', thence through the armature 101 to the contact 105 and thence to the power terminal 118. Should it occur that the switch 110 will close, which happens on a "hit" when the light spots R and S coincide, then the coil 102 is shorted and the armature 101 will become released and being spring-biased, will move away from the contact element 105 and make contact again with the contact points 103 and 104, whereupon the circuit of the bulbs of the series 28 will open and that of the bulb 27 will close and thereupon said bulb 27 will light up and stay lit to indicate that a "hit" occurred.

During the operation of the apparatus, the cam plate 60 is stationary, but its position on the shaft 48, determines the movement of the mirror carrier 54 about its axis of swing 125 and hence determines the locus of movement of the light spot S on the screen 21. Provision is made to change the tilt of the cam plate 60 with respect to the fixed plane of the gear 53, and to change the position of said cam plate along the shaft 48 and also to change the position of said cam plate around the shaft 48.

When the cam plate 60 is parallel to the plane of the gear 53, then as said gear turns, the mirror carrier 54 will not swing and the locus of movement of the light spot S will be a circle which is concentric with the circular path of the light spot R around the button 25. If now the cam plate 60 is set in a position to be tilted with respect to the plane of the gear 53 as in FIG. 8, the locus of movement of the light spot S will be an ellipse as 121 around the earth which is represented by the button 25, and the major axis of such elliptical path will be more to one side of earth's position. This simulates the true condition occuring when an actual satellite is in orbit around the earth. If now, the cam plate 60 is brought nearer to the gear 53 and hence nearer to the screen 21, with no change in its tilt, the locus of movement of the light spot S will be comparatively larger and represented by the ellipse 122. It is evident that movement of the cam plate 60 along the shaft 48, will change the size of the orbit of the light spot S. Change of tilt of said cam plate will also change the size of the elliptical orbit of the light spot S.

To change the tilt of the cam plate 60, the gear 45 must be turned a bit so it shall change its position along the screw 44. This is done by turning the control knob 33, which turns the gear train 35, 36, 45. When said gear 45 moves, the follower 63 is maintained against the face of said gear 45 by action of the spring 65, and the cam 60 will swing a bit about the axis 62 to any desired tilted position in relation to the plane of the gear 53.

If the control knob 34 is turned, the gear train 37, 38, 47 will turn. This will cause the cam plate 60 to turn a bit on the shaft 48, because the follower rod 63 will move with the gear 47. Such shift of the cam plate 60 will cause the elliptical path of the light spot S to assume the position of the orbit 123 which is turned in relation to the orbit 121, and such turn can be made sufficient for the orbit to assume the one shown at 124 which is about a half turn away in relation to the position of the orbit 121.

Upon turning said control knob 34 further, the pin 106 extending from the cam plate 60 will intercept the pin 107 extending from the race 46 and such race will be turned and thus move along the screw 44, thereby moving the cam plate 60 along the shaft 48 without change in tilt, whereupon the orbit 124 will become either smaller or be enlarged depending upon the direction of plate movement. When the size of the orbit is as desired, the control knob 34 is turned in the opposite direction to rotate the cam plate 60 to a position where the new orbit is desired on the screen 21.

Comparatively small movements of the gears 45 and 47 will materially change the orbit effected on the screen. However, to shift the position of the cam plate 60 along the shaft 48, may require more than a full turn of the race 46. The casing's exterior around the control knobs 33 and 34, may have graduations 126 and 127, respectively, with a pointer or mark on each of the said knobs, to indicate some characteristic of the orbit effected at the different positions of such controls.

The apparatus shown herein can be used as a game by placing it centrally on a table about which are seated the participants, one in front of each of the screens 21, 21', 21'', 21'''. The person at the controls 30, after plugging in the terminals 117, 118 to receive current, observes the lamp 27. If lit, the current is on. He then manipulates the knob 31 to close the switch 99, whereupon the motor 23 will operate and he then will push in the knob 32 to bring the armature 101 into contact with the contact element 105, whereupon the lamp 27 will become deactuated while the lamps 28, 28', 28'', 28''' will light up. Current will flow through the magnet coil 102 to hold the armature 101. He will then observe the light spots R and S effected from the mirrors 70 and 55 respectively on his screen 21 and if necessary, he will turn the knob 97 to bring the spot R very near to the button 25. Rotation of the motor 23 will turn the shaft 22 and the reduction gearing 42, 43 will drive the gear 39 and hence the shaft 48 and the gear 53 will turn, thereby turning the gears 39', 39'', 39'''. The performance of the light spots R and S occurring on the screen 21, will be duplicated on all the other screens 21', 21'' and 21'''. Now the person at the controls 30, will if he desires, manipulate one or both of the control knobs 33 and 34 to attain any desired orbit for the light spot S. The players will take turns to operate their trigger of the series 26. Before each player "fires," the person at the controls 30 may make adjustments of the control knobs 33 and 34, to change the orbit of the light spot S. When a hit is scored, meaning that the light spot R did overlap the light spot S, and so the switch 110 did close, the magnet coil 102 will be shorted and hence deactuated, and the armature 101 will be released and thus return to its position where it shall again contact the contact elements 103, 104, whereupon the lamps of the series 28 will become deactuated and the lamp 27 will light up and remain lit to indicate that a hit was scored.

The use explained is to simulate firing a rocket at a satellite in orbit. If desired, the person at the controls may continually manipulate the control knobs 33 and 34 while a player prepares to fire, thus making the light spot S travel in the manner of an airplane taking a devious course.

If desired, this apparatus can be used for instance in a show window to attract attention, by having the screen 21'' face the public, and from time to time by manual manipulation of the controls, the storekeeper can change the orbit taken by the light spot S to encompass printed or pictorial matter at different locations on the screen, which are not shown, but believed readily understood without further illustration.

It is to be noted that when the bulb 28 is lit, light received therefrom by the mirror 70 will reflect onto the screen 21 and constitute the light spot R and at the same time, light received from said bulb 28 by the mirror 55 will reflect onto the screen 21 and constitute the light spot S. Except upon the operation of a trigger of the series 26, the mirror 70 is stationary with respect to the unit 29, but will move in a circular path due to the rotation of the shaft 48, about the axis of such shaft. It is upon the operation of a trigger that the mirror 70 will rotate about the axis of the gear 69, for it is then that said gear is made to rotate one revolution as has been explained, or said gear 69 may be turned by working the knob 97 to adjust the position of the spot of light R to be close to the button 25. How such movements of said mirror 70 come about will now be set forth.

Since the sleeve 82 is normally very loose on the motor shaft 22 and the shaft 73 is very loose through the gear 39, and since it takes more power to turn the shaft 73 than to revolve the sleeve 82, the shaft 73 will turn with the shaft 48, but not in relation to said shaft 48. Hence upon the operation of the motor 23, the sleeve 82 will turn loose. It is only when the said sleeve is held against rotation that the gear 74 will stop and hence the shaft 73 will stop with respect to the shaft 48, and thus cause the gear 69 to turn, due to the rotation of the gear 76 turning around the stopped gear 74 with which it meshes.

When the motor 23 is running, the operation of any trigger of the series 26 will cause a measured momentary engagement of the gear 86 by the related lever of the series 92. During such engagement, the sleeve 82 will be held against rotation, and hence the mirror-carrying gear 69 will be turned. When said motor is at rest, if the knob 97 is pushed in so that the gear 98 shall engage the gear 86 and then the knob is turned, the sleeve 82 will turn and thus cause said gear 69 to be turned. It is to be noted that when the motor is operating and the mirror-carrying gear 69 is rotated, that the locus of movement of the light spot R will be an arcuate path from earth position at the button 25, which path intersects the orbit of the light spot S. This substantially simulates the trajectory of a missile.

Though the preferred embodiment shown herein includes four screens, it is evident that apparatus of this character may be built with just one screen with the controls 30, or may be made with additional screens and operating units, with just the one set of controls. If desired, in any construction, the controls may be omitted, in which case the cam plate 60 would be fixed and the orbit of the light spot S would be unchangable. It is also evident that if desired, apparatus embodying only part of the teachings of this invention may be built, as for instance, one may only want the light spot R and its possible movements on the screen 21. In such case all mechanism relating to the creation and control of the light spot S is omitted. Or one may want only the light spot S and its incidents, in which case all mechanism relating to the creation and control of the light spot R is omitted.

In various embodiments of teachings of this invention, the light spots R and S may be effected on the screen by a beam of light issuing directly from a flashlight device 126, which may carry its own dry cells if the switching arrangement requires no opening of their circuit during operation. In each instance such flashlight means would replace a mirror and a bulb 28, and be carried on what formerly was a mirror carrier as 54 or 69, now indicated in FIG. 12 as C.

The reduction gearing 42, 43 has been included in the embodiment illustrated, to attain better simulation of the relative speeds of the satellite and the earth in their respective orbits. If such is not desired, such speed reduction means is omitted, whereupon the gear 79 is to be fixed to the shaft 22 and all the gears of the series 39 may be identical as shown in FIG. 7, where gear 39a takes the place of the gear 39 in the mechanism unit 29.

For the purposes intended with the apparatus shown, it is recommended that the motor 23 be one having a speed of 1 r.p.m., which is a well known article commonly produced for inclusion in electric clocks.

This invention is capable of numerous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claims rather than to the specific description herein to indicate the scope of this invention.

I claim:

1. In a device of the character described, the combination of a screen through which light can pass, a member spaced from said screen and rotatably mounted about an axis which is in angular relation with said screen, a means to direct light rays onto said screen to cause a light spot to appear on said screen, rotatably carried on said member at a position away from said axis whereby on rotation of said means on said member, such light spot will move on the screen, towards and away from said axis, means to revolve said member, means including a trigger, to cause said light-directing means to rotate on said member when said trigger is operated, and means to allow the light-directing means to rotate only one revolution upon each operation of said trigger.

2. An apparatus as defined in claim 1, including means for manually turning the light-directing means on said member, independently of trigger operation.

3. An apparatus as defined in claim 1, including an electric bulb positioned substantially coaxially with said axis and extending in the space between said screen and said member; said light-directing means being a mirror element positioned so that it reflects light it receives from said electric bulb, onto the screen to cause the light spot.

4. In a device of the character described, the combination of a screen through which light can pass, a first member spaced from said screen and rotatably mounted about an axis which is in angular relation to the screen, a first means to direct light rays onto said screen to cause a light spot to appear on said screen, swingably carried on said first member at a position away from said axis whereby on the occurrence of such swinging movement, such light spot will move on the screen towards and away from the line of said axis, a second means to cause such swinging movement of the light-directing means upon rotation of said first member, a second member spaced from the screen, positioned intermediate said screen and the first member and rotatably mounted about said axis, a second means to direct light rays onto said screen to cause a second light spot to appear on the screen, rotatably carried on the second member at a position away from said axis whereby on rotation of said light-directing means on the second member, the second light spot will move on the screen towards and away from said axis, means to differently revolve said first and second members, means including a manually-operated trigger to cause said second light-directing means to rotate on said second member when the trigger is operated and means adapted to allow said second light-directing means to rotate substantially one revolution on the second member, upon each operation of said trigger.

5. An apparatus as defined in claim 4, including means for manually turning said second light-directing means, independently of trigger operation.

6. An apparatus as defined in claim 4, wherein the second means is a cam extending around said axis, in fixed position in relation to the screen, and a cam follower extending from said first means, biased to contact said cam.

7. An apparatus as defined in claim 4, wherein said screen is substantially flat and said axis of rotation is substantially perpendicular to said screen whereupon rotation of said first member, the locus of movement of the light spot on the screen will be along the perimeter of an ellipse.

8. An apparatus as defined in claim 4, wherein the second means is a plate cam extending around said axis, in fixed position in relation to the screen, and a cam follower extending from said first means, biased to contact said plate on a surface of said plate; the plane of said plate surface being tilted with respect to said axis.

9. An apparatus as defined in claim 8, including means to adjust the tilt of said cam plate.

10. An apparatus as defined in claim 8, including means to adjust the position of said cam plate along said axis.

11. An apparatus as defined in claim 8, including means to adjust the position of said cam plate by a turning movement about said axis.

12. An apparatus as defined in claim 8, including means to adjust the position of said cam plate along said axis and means to adjust the tilt of said cam plate.

13. An apparatus as defined in claim 8, including means to adjust the tilt of said cam plate and means to adjust the position of said cam plate by a turning movement about said axis.

14. An apparatus as defined in claim 8, including means to adjust the position of said cam plate along said axis and means to adjust the position of said cam plate by a turning movement about said axis.

15. An apparatus as defined in claim 8, including means to adjust the tilt of said cam plate, means to adjust the position of said cam plate along said axis and means to adjust the position of said cam plate by a turning movement about said axis.

16. An apparatus as defined in claim 4, including an electric bulb positioned substantially coaxially with said axis and extending in the space between said screen and the second member; each of said light-directing means being a mirror element positioned so that each respectively reflects light it receives from said bulb, to cause one of the light spots on the screen respectively.

17. An apparatus as defined in claim 4, including an electric bulb positioned substantially coaxially with said axis and extending in the space between said screen and the second member; each of said light-directing means being a mirror element positioned so that each respectively reflects light it receives from said bulb, to cause one of the light spots on the screen respectively, two electrically conductive elements, carried one along with each of said mirror elements respectively and constituting a first switch; said conductive elements being in wiping contact when the mirrors are in such positions respectively that the respective light spots caused by them on the screen coincide, a circuit to actuate said bulb, a normally open second switch interposed in said circuit whereby said bulb is actuated when said second switch is closed and an electro-magnet in series with said bulb, adapted when actuated, to close said second switch; the first switch being connected across said electro-magnet, whereupon closing of the first switch, said electromagnet will be shunted thereby and become deactuated thereby causing the second switch to be opened.

18. An apparatus as defined in claim 17, including an electrical signal device, a circuit to operate said device and a normally closed third switch interposed in said signal circuit; the second and third switches having a common operating member which holds the third switch closed when the second switch is open; said electro-magnet when actuated, acting on said operating member to close the second switch whereupon the third switch is opened.

19. In an apparatus of the character described, a frame, a plurality of units carried on the frame, each unit comprising in combination, a screen through which light can pass, a first member spaced from said screen and rotatably mounted on an axis which is in angular relation to said screen, a first means to direct light rays onto the screen to cause a light spot to appear on said screen, swingably carried on said first member at a position away from said axis whereby on the occurrence of such swinging movement, such light spot will move on the screen towards and away from the line of said axis, a means to cause such swinging movement of the first light-directing means upon rotation of the first member, a second member spaced from the screen, positioned intermediate the screen and the first member and rotatably mounted about said axis, a second means to direct light rays onto said screen to cause a second light spot to appear on the screen, rotatably carried on the second member at a position away from said axis whereby on rotation of said second light-directing means on the second member, the second light spot will move on the screen towards and away from said axis, means including a manually-operated trigger to cause the second light-directing means to rotate on the second member when the trigger is operated and means adapted to allow said second light-directing means to rotate substantially one revolution on the second member, upon each operation of the trigger; the screens of said units being in separate locations on the frame and independently viewable; the triggers of said units being in separate locations on the frame and independently operable; the first light-directing means of all of said units being positioned in corresponding positions in said units so that the light spots they cause on the screens appear at like positions on said screens respectively; the second light-directing means of all of said units being positioned in corresponding positions in said units so that the light spots they cause on the screens appear at like positions on the screens respectively; the means in all of the units for causing swinging movement of the first light-directing means upon rotation of the first members, operating simultaneously to cause identical swinging movements of all of the first light-directing means of said units, a means for rotating the first members of all of the units in synchronism and a means for rotating the second members of all of the units in synchronism, at a speed differing from that of the first members.

20. An apparatus as defined in claim 19, wherein in each of said units the means to cause the swinging movement of the first light-directing means upon rotation of the first member, is a cam extending around the axis in fixed position in relation to the screen and a cam follower extending from the first light-directing means, biased to contact said cam.

21. An apparatus as defined in claim 19, wherein in each of said units the screen is substantially flat and the axis of rotation of the first member is substantially perpendicular to the screen whereupon rotation of the said first member, the locus of movement of the light spot caused by the first light directing means on the screen will be along the perimeter of an ellipse.

22. An apparatus as defined in claim 19, wherein in each of said units the means to cause swinging movement of the first light-directing means is a cam plate extending around the axis in fixed position in relation to the screen and a cam follower extending from the first light-directing means, biased to contact said plate on a surface of such plate; the plane of said plate surface being tilted with respect to the axis; the cam plates of all the units being similarly tilted and identically positioned in said units respectively.

23. An apparatus as defined in claim 22, including a means to simultaneously and similarly adjust the tilt of all the cam plates of said units.

24. An apparatus as defined in claim 22, including a means to simultaneously and similarly adjust the position of all the cam plates along the axes respectively.

25. An apparatus as defined in claim 22, including a means to simultaneously and similarly adjust the position of all the cam plates by a turning movement about the axes respectively.

26. An apparatus as defined in claim 22, including a means to simultaneously and similarly adjust the tilt of all the cam plates of said units and a means to simultaneously and similarly adjust the position of all the cam plates along the axes respectively.

27. An apparatus as defined in claim 22, including a means to simultaneously and similarly adjust the tilt of all the cam plates of said units and a means to simultaneously and similarly adjust the position of all said cam plates by a turning movement about said axes respectively.

28. An apparatus as defined in claim 22, including a means to simultaneously and similarly adjust the position of the cam plates along the axes respectively and a means to simultaneously and similarly adjust the position of all the cam plates by a turning movement about the axes respectively.

29. An apparatus as defined in claim 22, including a means to simultaneously and similarly adjust the tilt of all the cam plates of said units, a means to simultaneously and similarly adjust the position of said cam plates along the axes respectively and a means to simultaneously and similarly adjust the position of said cam plates by a turning movement about the axes respectively.

30. An apparatus as defined in claim 19, wherein each of the units includes an electric bulb positioned substantially coaxially with the axes and extending in the space between the screen and the second member; each of the light-directing means including a mirror element positioned so that each respectively reflects light it receives from said bulb, to cause one of the light spots on the screen respectively.

31. An apparatus as defined in claim 30, wherein one of the units include two electrically conductive elements, carried one along with each of said mirror elements respectively and constituting a first switch; said conductive elements being in wiping contact when the mirrors of the unit are in such positions respectively that the respective light spots caused by them on the screen coincide, a circuit to simultaneously actuate all the bulbs, said apparatus also including a normally open second switch interposed in said circuit whereby said bulbs are actuated when said second switch is closed, an electro-magnet in series with said bulbs, adapted when actuated, to close said second switch; the first switch being connected across said electro-magnet whereupon closing of the first switch, said electro-magnet will be shunted thereby and become deactuated whereby causing the second switch to be opened.

32. An apparatus as defined in claim 31, including an electrical signal device, a circuit to operate said device and a normally closed third switch interposed in said signal circuit; the second and third switches having a common operating member which holds the third switch closed when the second switch is open; said electro-magnet when actuated, acting on said operating member to close the second switch whereupon the third switch is opened.

References Cited

UNITED STATES PATENTS

| | | | |
|---|---|---|---|
| 2,094,659 | 10/1935 | Levin | 40—106.52 |
| 2,593,117 | 4/1952 | Davenport | 273—101.1 X |
| 3,003,257 | 10/1961 | Madden | 35—43 |
| 3,012,368 | 12/1961 | Friedman | 273—1 X |
| 3,035,356 | 5/1962 | Musser | 35—45 |
| 3,074,183 | 1/1963 | Frank | 35—45 |
| 3,146,665 | 9/1964 | Domeshek et al. | 35—25 X |
| 3,147,664 | 9/1964 | Gelfand | 273—105.1 X |

ANTON O. OECHSLE, *Primary Examiner.*

RICHARD C. PINKHAM, DELBERT B. LOWE, *Examiners.*

G. L. PRICE, *Assistant Examiner.*